United States Patent Office 3,031,280
Patented Apr. 24, 1962

3,031,280
NOVEL BORON-PHOSPHORUS CONTAINING COMPOUNDS AND GASOLINES CONTAINING THE SAME
Philip S. Fay, Lyndhurst, Edwin O. Hook, Chagrin Falls, Everett C. Hughes, Shaker Heights, and Chien-Wei Liao, Beachwood, Ohio, assignors to The Standard Oil Company, Cleveland, Ohio, a corporation of Ohio
No Drawing. Filed Mar. 10, 1960, Ser. No. 13,978
4 Claims. (Cl. 44—63)

This invention relates to novel compounds containing both boron and phosphorus, a method for preparing such compounds, and a motor fuel containing the same. More particularly, this invention relates to a class of compounds providing both elemental boron and phosphorus in the molecule which are multi-purpose additives for a motor fuel for use in a spark-ignited internal combustion engine.

The novel compounds of this invention have the following general formula:

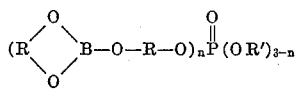

where R is an alkylene group, preferably an alpha or beta alkylene group, containing from 4 to 12 carbon atoms, R' is an alkyl, aryl, alkaryl, or arylalkyl group containing up to about 12 carbon atoms, and wherein $n$ is a small whole number of from 1 to 3.

It is well known today that the inclusion of small amounts of elemental boron to a fuel is helpful to increase the efficiency of the combustion in an internal combustion engine. It is also well recognized that the introduction of elemental phosphorus into the engine during combustion is beneficial to engine operation. However, although boron and phosphorus are known to offer such advantages to fuel, the number of compounds found as desirable for incorporating these elements independently into gasoline has been limited due to the difficulty of finding compounds which are satisfactorily volatile for use and sufficiently soluble and/or stable in gasoline for use in large-scale manufacturing and marketing operations characteristic of the petroleum industry today. In particular, many of the organo boron compounds heretofore proposed have been characteristically unstable towards hydrolysis so that contact with small amounts of water and moisture during prolonged storage causes many of such compounds to hydrolyze to solid, insoluble products which precipitate out of the gasoline so that the boron content originally present in the gasoline never reaches the engine where it might be effective.

Considering the problems, therefore, that have been experienced in the past involving attempts to introduce boron and phosphorus separately into gasoline by means of organo compounds which are successful in meeting the above criteria for a fuel additive, it is quite surprising that both boron and phosphorus can be introduced into gasoline in a stable and soluble form by means of a single compound such as in accordance with the present invention. The fact that boron and phosphorus may be introduced by one compound rather than by two different compounds offers the advantage of reduced handling during the incorporation of the additive into the gasoline. Furthermore, the use of a compound of the invention assures the ratio of boron to phosphorus remaining constant from batch to batch without the need for any additional control procedures otherwise required when two different compounds must be added separately by means of automatic blending equipment or the like. These advantages, coupled with the fact that these materials may be produced from relatively low cost raw materials by simple and inexpensive process techniques, make the compounds of this invention highly desirable from economic considerations for use as gasoline additives.

The compounds of the present invention are effective as multi-purpose additives in gasoline. Motor fuel containing one or mixtures of the compounds of the present invention are effective in markedly reducing many of the adverse effects resulting from combustion chamber deposits which accumulate during the prolonged operation of an initially clean engine on a hydrocarbon fuel, and particularly a hydrocarbon fuel which contains tetraethyl lead as an octane improver. One serious adverse effect of lead deposits is uncontrolled ignition and a general lack of smoothness in engine operation caused principally by these deposits becoming heated to incandescence within the combustion chamber during engine operation and either igniting the fuel before or after the portion in the cycle at which the charge would be normally ignited by the spark of the sparkplug. Another serious adverse effect of lead deposits is misfiring of the engine due to sparkplug fouling. This, of course, causes a loss in engine power and a serious reduction in the life of the sparkplugs. The motor fuel compositions of the present invention are particularly effective in overcoming these two serious adverse effects of combustion zone deposits.

It has also been found that the compounds of this invention when used in a gasoline composition are valuable in assisting to safeguard the motorist against fuel line freezing in cold climatic conditions. This problem is often experienced in lower ambient temperatures when moisture which is invariably present in the fuel either from the commercial handling of the fuel or from condensation within the individual fuel tank freezes within the fuel system, thereby blocking the flow of fuel to the engine and interfering with operation. The use of lower aliphatic alcohols such as methanol, isopropanol, or mixtures thereof, in gasoline has received widespread acceptance to protect against such a freezing condition. The function of the alcohols in this respect, however, has been found to be linear with concentration; and to obtain adequate protection large amounts must be used, making the economics quite unfavorable. It has been found that the presence of compounds of the present invention in gasoline in combination with alcohol makes it possible to significantly reduce the amount of alcohol that is required to provide protection against fuel line freezing. Fortuitously, the amount of boron-phosphorus compound required to obtain this effect is no more than is usually required to minimize the adverse effects of combustion chamber deposits.

The preferred method for preparing the compounds of the present invention involves using as a starting material a diglycol borate compound of the following general formula:

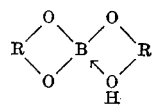

in which R is an alkylene group, preferably an alpha or beta alkylene group, containing from 4 to 12 carbon atoms or a reaction mixture containing said diglycol borate compound obtained by reacting 2 moles of the corresponding alkylene glycol with 1 mole of boric acid. The above formula for diglycol borates is intended to include compounds in which the alkylene radical is different for the two positions shown for R in the formula; e.g., where one R is hexylene and the other R is butylene. The diglycol borate or the reaction mixture described above is then preferably reacted in a one-step process with a phosphorus source of the following general formula:

where X and Y may be chlorine or OR′ in which R′ is an alkyl, alkaryl, or arylalkyl group containing up to 12 carbon atoms, so that when X and Y are both Cl the reaction goes as follows:

(a)

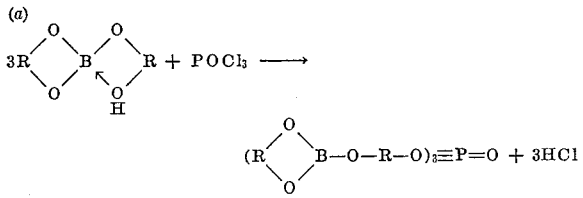

when X or Y is —OR′ and the other is Cl, the reaction goes as follows:

(b)

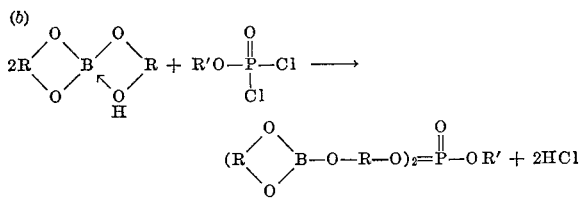

and when X and Y are both —OR′ the reaction goes as follows:

(c)

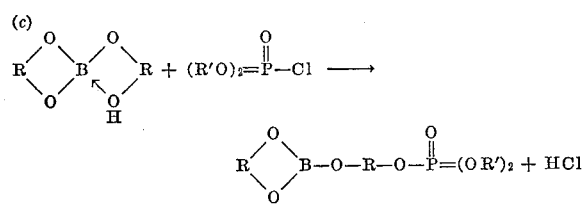

The reaction is carried out by heating the reactants together in the presence of a solvent at refluxing temperatures. The hydrogen chloride formed during the reaction may be removed from the reaction mixture preferably by blowing with air but may also be removed by means of an acceptor such as an organic or inorganic base. Illustrative of hydrogen chloride acceptors found useful in the method of the invention are pyridine, ammonia, sodium hydroxide, and potassium hydroxide. Obviously, the temperature of reaction will be dependent upon the choice of solvent. When the hydrogen chloride is removed by air blowing, the solvent may be either saturated hydrocarbons, aromatic hydrocarbons, or mixtures thereof having a boiling point under 100° C. Reaction temperatures over 100° C. are to be avoided since the glycol-borates have a tendency to decompose above this temperature and product yields are adversely affected. On the other hand, it is preferred to use a solvent having a high boiling point within this practical limit since generally in the reaction the higher the temperature, the shorter is the time for complete reaction. A preferred temperature for the reaction is from about 80° C. to 100° C. Illustrative examples of suitable solvents for the reaction are cyclohexane, n-pentane, n-hexane, n-heptane, naphtha blends boiling in the range of from 80–100° C., benzene, aromatic blends boiling in the range of from 80–100° C., or mixtures thereof. Where caustic such as sodium or potassium hydroxide is used to remove the hydrogen chloride formed in the reaction, it is preferred to avoid the use of aromatic hydrocarbons as solvents for the reaction since gellation problems may be encountered with these materials. It has been found that the saturated hydrocarbons which boil below 100° C., and these materials in admixture with polar solvents such as tertiary alcohols, ethers, or ketones, perform suitably in the reaction when caustic is used as a hydrogen chloride acceptor.

The following examples are illustrative of the preparation of the compounds of the invention but are not intended to limit the invention in any way.

EXAMPLE I 93.9 grams of di-(butanediol-1,3) borate and 86.0 grams of di-ethyl-chloro-phosphate were placed in a three-necked flask adapted with an azeotropic trap together with 250 milliliters (ml.) of cyclohexane and 5 ml. of tertiary butanol. This mixture was heated at refluxing temperature (83° C.). 20 grams of sodium hydroxide in pellet form was added to the reaction mixture in 5 gram increments. The refluxing was continued over a period of 13 hours, during which 9.5 ml. of water was collected in the azeotropic trap. The reaction mixture was then filtered to remove the salt formed during the reaction and the filtrate was collected and then stripped on a rotary evaporator to recover the product. The yield of product was 99.2% that of theoretical. Analysis showed 9.1% phosphorus and 3.29% boron. The calculated amount of phosphorus was 9.6% and boron, 3.36%. The product has the formula:

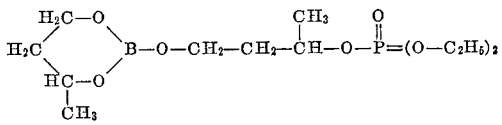

and was 80% soluble in a solvent mixture of 20% benzene and 80% pentane.

EXAMPLE II 19.8 grams of di-(butanediol-1,3) borate was placed in a three-necked flask with 20.4 grams of di-ethyl-chloro-phosphate. 7.9 grams of pyridine and approximately 300 ml. of ethyl ether were added to the flask and the mixture heated at the reflux temperature for 20 hours. After this period the reaction mixture was stripped on a rotary evaporator to remove final traces of hydrogen chloride. The yield of the final product was 87% of theoretical. The product was a straw-colored liquid identical to the product prepared by Example I.

EXAMPLE III 93.9 grams of di-(butanediol-2,3) borate and 43.7 grams of isobutyl-dichloro-phosphate were added to a flask equipped with a mercury seal stirrer and air bubbler and approximately 200 ml. of benzene was added and the mixture heated at refluxing temperature for 10 hours. During this time the mixture was flushed with a gentle stream of air to aid in the removal of the hydrogen chloride formed. The hydrogen chloride was trapped during the reaction in 250 ml. of water containing 100 grams of sodium hydroxide and 5 ml. aliquots were removed from this trap periodically and titrated to monitor the completeness of reaction. When no more hydrogen chloride was evolved, the reaction was stopped and the reaction mixture was stirred to dryness on a rotary evaporator with the aid of vacuum. The yield of product was 98% of theoretical. The product was soluble in gasoline and has the formula:

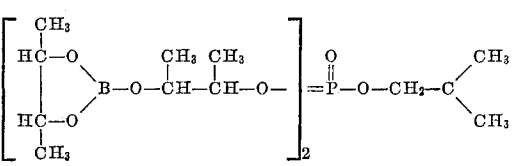

EXAMPLE IV

The product of Example III was also prepared by another embodiment of the invention as follows:

93.9 grams of di-(butanediol-2,3) borate and 76.7 grams of phosphorus-oxytrichloride were added to a three-necked flask, together with 50 ml. of benzene, and heated at the refluxing temperature of 82° C. for 7½ hours. The hydrogen chloride formed during the reaction was trapped in 250 ml. of water containing 75 grams of sodium hydroxide. 5 ml. aliquots were removed from this trap periodically and titrated to monitor the rate of hydrogen chloride evolution and the completeness of reaction. 100 ml. of the reaction material remaining in the flask containing 0.1 mole of the compound having the formula:

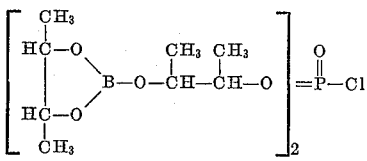

was placed in a flask with 7.4 grams of isobutyl alcohol (0.1 mole) and heated to reflux. The hydrogen chloride formed was removed by air blowing and was absorbed in 200 cc. of an aqueous solution containing 0.249 mole of sodium hydroxide. 5 cc. aliquots of this solution were titrated periodically as before to monitor the reaction so as to determine when all the hydrogen chloride was removed. The refluxing was continued for 5½ hours at a temperature of 86° C. The reaction mixture was then stripped to dryness on a rotary evaporator with the aid of vacuum. The yield of product was 100% of theoretical and was a light brown liquid 93% soluble in a solvent mixture of 20% benzene and 80% pentane.

EXAMPLE V

This example illustrates that the diglycol borate may contain two different alkylene radicals. 43.1 grams of 2-methyl pentanediol-2,4 hydrogen borate was heated with 27.0 grams of butanediol-2,3 in approximately 200 ml. of benzene to azeotropically remove the theoretical amount of water. The benzene solution of the resulting diglycol borate was then placed into a 1-liter, three-necked flask equipped with a mercury seal stirrer and air bubbler. A solution of 15.4 grams of phosphorus oxytrichloride in 50 ml. of benzene was added rapidly to this mixture and the mixture heated at reflux conditions for 7 hours. During this time the mixture was flushed with a gentle stream of air to aid in the removal of the hydrogen chloride formed. The hydrogen chloride was passed to a sodium hydroxide trap where 5 cc. aliquots of the solution were removed and titrated periodically to monitor the completeness of reaction. After all the hydrogen chloride was evolved, the reaction mixture was stripped on a rotary evaporator. A light brown product was obtained from which small amounts of crystals formed on standing. The yield of product was 80% of theoretical and it was 88% soluble in a solvent mixture of 20% benzene and 80% pentane. The product has the formula:

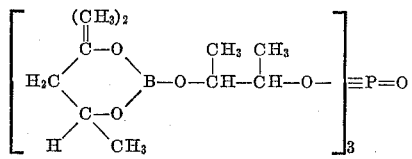

Analysis showed 4.3% phosphorus and 5.0% boron against a calculated value of 4.49% for phosphorus and 4.689% for boron.

The hydrocarbon stocks for the fuel compositions of the invention may be any of those conventionally used in preparing a motor gasoline for a spark-ignited internal combustion engine such as catalytic distillate, motor polymer, alkylate, catalytic reformate, isomerate, naphthas, etc. The motor fuel also contains tetraethyl lead in amounts up to 6 ml. per gallon but usually from ½ ml. to 3 ml., and a scavenging agent.

It is also intended that the fuel of the invention may also contain conventional amounts of additives commonly employed, such as tetraethyl lead appreciators, oxidation inhibitors, gum inhibitors, solvent oil, dyes, and the like.

The amount of the boron-phosphorus compounds of the invention that is to be added to the fuel is preferably expressed as the amount theoretically required to convert the lead introduced into the fuel in the form of tetraethyl lead to lead orthophosphate. Amounts corresponding to at least about 0.1 times that theoretically required must generally be used to obtain beneficial results, and amounts coresponding to 0.2 to 0.4 times that theoretically required are particularly effective. Greater amounts may be incorporated but generally amounts corresponding to more than 1 times that theoretically required cannot be economically justified.

A clearer understanding of the benefits derived from the use of the compounds of the invention in a gasoline composition will be obvious from the following testing programs.

*Plug Fouling*

A test was devised to determine the hours of operation on a fuel to plug failure due to excessive misfiring. The system for the test comprises the operation of a first engine to subject the plug to running conditions on the test fuel and the operation of a second engine to test the plug for fouling.

The first engine was a standard 1952 Chevrolet engine equipped with Power Glide automatic transmission. This engine was run under constant engine conditions for test periods of 20 hours each. Operation during each 20-hour test period included a two-phase 6-minute cycle. The first phase consisted of 5 minutes and 50 seconds at 2000 r.p.m. The second phase was 10 seconds at 2000 r.p.m. at wide-open throttle.

After each 20-hour interval, the plugs were removed and individually tested for misfire in a cylinder of the second test engine which was a 1954 Lincoln with a compression ratio of 8.0:1 and standard in all respects except that a separate exhaust manifold was provided for the test cylinder. After inserting the plug for test, the Lincoln engine was warmed up for 60 seconds at 3000 r.p.m. under no load. The engine was then stressed for 60 seconds at 3100 r.p.m. and wide-open throttle. Misfire was measured electronically and recorded on an oscillograph whereon maximum load loss over the 60-second interval was recorded.

If the plug misfired more than 10 times during the 60-second load test on the Lincoln engine, the plug was considered fouled and the test terminated for the particular plug. If the plug misfired less than 10 times during the 60-second load test on the Lincoln engine, a subsequent 20 hours of running time was permitted for the plug in the Chevrolet engine operated on the test fuel and then the plug was tested again on the Lincoln engine for a 60-second load test. If during this 60-second load test the plug showed any number of misfires, it was considered fouled at the time of the last test and this was recorded as the result of the test. If, however, the plug appeared clear of misfire in this second chance, it was continued in the test as a good plug until it fouled in a subsequent test period.

Gasolines with and without a compound of the invention were compared in the above test. All experimental conditions were the same for each test except the fuel. The base gasoline stock for each fuel was the same and had the following composition and specifications:

Composition:
    Saturates _____percent__ 60
    Olefins _____do____ 11
    Aromatics _____do____ 29
API gravity _____ 59.1

Engler distillation:
- IBP ............................. °F.. 97
- 10% ............................. °F.. 125
- 30% ............................. °F.. 172
- 50% ............................. °F.. 229
- 70% ............................. °F.. 274
- 90% ............................. °F.. 342
- EP .............................. °F.. 408

Reid vapor pressure ................... 10.0
Tetraethyl lead ................... cc.. 3.0
F-1 octane rating No. ................. 99.2

The average number of hours until fouling over two runs on each of the fuels was recorded as the result of the test, and results are reported in Table I below.

TABLE I

| Fuel: | Time in hours to fouling |
|---|---|
| Base fuel | 27 |
| Base fuel +0.2 theories P as the compound of Example I | 85 |

*Multi-Cylinder Engine Smoothness*

A test procedure was devised to determine the effectiveness of test fuels in a running period to suppress vibration signals given off by an engine of a predetermined magnitude which may be considered other than normal engine harmonics. This test employed a 1956 Oldsmobile engine with a 11.3:1 compression ratio in which two General Radio crystal-type vibration picks-ups were attached at the front main bearing area mounted in sponge rubber. The vibrations over a predetermined magnitude were rectified and amplified and counted electronically.

To stabilize the engine with respect to combustion chamber deposits, the engine was run at 1800 r.p.m. and a manifold vacuum of 15 inches of mercury for approximately 200 hours. Then preparatory to the test cycle for each fuel, the engine was operated on the test fuel for 30 minutes at 1800 r.p.m. and 15 inches of mercury vacuum. Following this, the engine was continued at 1800 r.p.m. and the throttle opened to 8 inches of mercury vacuum for a 70-second test period in which the vibrations were counted as the result of the test. All experimental conditions were the same for each test except the gasoline.

The base fuel in each test was the same and had the following composition and specifications:

Composition:
- Saturates ...................... percent.. 60
- Olefins ........................ do.... 11
- Aromatics ...................... do.... 29

API gravity ........................... 59.1

Engler distillation:
- IBP ............................. °F.. 97
- 10% ............................. °F.. 125
- 30% ............................. °F.. 172
- 50% ............................. °F.. 229
- 70% ............................. °F.. 274
- 90% ............................. °F.. 342
- EP .............................. °F.. 408

Reid vapor pressure ................... 10.0
Tetraethyl lead ................... cc.. 3.0
F-1 octane rating No. ................. 99.2

In Table II below the vibration count for a fuel with and without a compound of the invention is reported.

TABLE II

| Fuel: | Count |
|---|---|
| Base fuel | 341 |
| Base fuel +0.2 theories P as the compound of Example I | 247 |

It will be obvious from the above data that the boron-phosphorus compound is effective in promoting engine smoothness.

*Fuel Line Anti-Freezing*

To demonstrate the coaction of the boron-phosphorus compounds of the present invention with lower aliphatic alcohols in preventing operational distress due to ice formation in the fuel system, a fuel handling system simulating that associated with an automotive engine was devised and adapted to be run in a cold box having a volume of approximately 2 cubic feet. This cold box is cooled with Dry Ice and a blower is present within the box so that the cold air may be circulated and the temperature maintained uniform. In the fuel system provided in the box a fuel tank is connected to a fuel filter by approximately 190 inches of $5/16$-inch copper tubing, a fuel line length similar to the fuel line in an automobile. A U-tube section is located in the fuel line immediately after the fuel tank, similar to the type provided in the fuel system of a car as a water trap. The fuel filter has a glass bowl so that ice formation at this point in the system may be visually detected. An electric pump is connected to the fuel filter by a short section of copper tubing. The outlet side of the pump is connected to a single-barrel carburetor by another short section of tubing in which a flowmeter (rotameter) is located to measure the flow rate of fuel through the system. A flow valve is adapted to the carburetor to return fuel to the fuel tank. Windows are provided in the cold box at the areas where the fuel filter and the flowmeter are located so that each of these elements may be observed by the operator during the test.

In the above equipment, fuel compositions reported in Table III below were tested at depressed temperatures to determine at what temperature operational distress would be encountered. Distress conditions for the fuel system were determined by noting when the fuel flow as indicated on the flowmeter fell below a predetermined value, together with noting ice formation in the glass bowl of the fuel filter. The base fuel was iso-octane which contained 1% by weight water.

TABLE III

| Run No. | Additive | Distress Temperature, °F. |
|---|---|---|
| 1 | | 29 |
| 2 | 0.25 Wt. Percent Methanol | 15 |
| 3 | 0.55 Wt. Percent Methanol | 0 |
| 4 | 0.25 Wt. Percent Methanol + 0.2 theories P as the compound of Example I based on 3 ml. TEL in the fuel. | -3 |

From the data in Table III it will be obvious by comparing runs 3 and 4 that by the use of only small amounts of the boron-phosphorus compound of the present invention the amount of methanol required to provide protection against fuel line freezing at low ambient temperatures may be markedly reduced.

It is to be understood that various modifications of the foregoing invention will occur to those skilled in the art upon reading the above description. All such modifications are intended to be included as may be reasonably covered by the appended claims.

We claim:

1. A motor fuel for a spark-ignited internal combustion engine containing from ½ to 6 cc. of tetraethyl lead per gallon, and a compound selected from the following general formula:

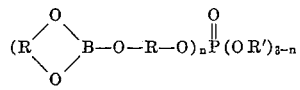

wherein R is an alkylene group containing from 4 to 12 carbon atoms, R′ is a hydrocarbon radical selected from the group consisting of alkyl, aryl, alkaryl, and arylalkyl groups containing up to 12 carbon atoms, and where $n$ is a small whole number of from 1 to 3, in an amount sufficient to provide 0.1 to 0.4 times that theoretically required to convert the lead present in the fuel in the form of tetraethyl lead to lead orthophosphate.

2. A gasoline for a spark-ignited internal combustion engine containing from ½ to 6 cc. of tetraethyl lead per gallon, and a compound having the formula:

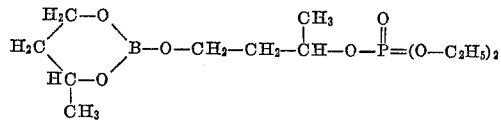

in an amount sufficient to provide 0.1 to 0.4 times that theoretically required to convert the lead present in the fuel in the form of tetraethyl lead to lead orthophosphate.

3. A new compound having the following general formula:

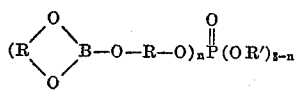

wherein R is an alkylene group containing from 4 to 12 carbon atoms, R' is a hydrocarbon radical selected from the group consisting of alkyl, aryl, alkaryl, and arylalkyl groups containing up to 12 carbon atoms, and where $n$ is a small whole number of from 1 to 3.

4. A method of preparing a compound having the following general formula:

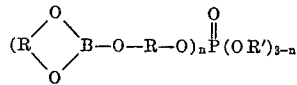

wherein R is an alkylene group containing from 4 to 12 carbon atoms, R' is a hydrocarbon radical selected from the group consisting of alkyl, aryl, alkaryl, and arylalkyl groups containing up to 12 carbon atoms, and where $n$ is a small whole number of from 1 to 3, consisting of the step of reacting at refluxing temperature a diglycol borate compound of the general formula:

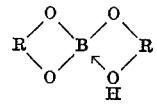

in which R is defined as above, with a phosphorus source of the general formula:

where X and Y are selected from the group consisting of chlorine and OR' in which R' is defined as above, in the presence of a solvent having a boiling point under 100° C., and removing the hydrogen chloride that is formed.

No references cited.